(12) United States Patent
Cottrille et al.

(10) Patent No.: US 7,882,035 B2
(45) Date of Patent: Feb. 1, 2011

(54) PRE-PERFORMING OPERATIONS FOR ACCESSING PROTECTED CONTENT

(75) Inventors: Scott C. Cottrille, Sammamish, WA (US); Gregory Kostal, Kirkland, WA (US); Rushmi U. Malaviarachchi, Redmond, WA (US); Jeffrey M. Brown, Bellevue, WA (US); Umesh R. Dhond, Redmond, WA (US); Amit Fulay, Kirkland, WA (US); Jody A. Hendrix, Kirkland, WA (US); Krassimir E. Karamfilov, Bellevue, WA (US); Yevgeniy Rozenfeld, Redmond, WA (US); Vladimir Yarmolenko, Duvall, WA (US); Yuhui Zhong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 12/020,058

(22) Filed: Jan. 25, 2008

(65) Prior Publication Data

US 2009/0192942 A1 Jul. 30, 2009

(51) Int. Cl.
G06F 21/00 (2006.01)
(52) U.S. Cl. ......................... 705/59; 705/902
(58) Field of Classification Search .................. 705/59, 705/902
See application file for complete search history.

(56) References Cited

U.S. PATENT DOCUMENTS

| | | | |
|---|---|---|---|
| 6,292,895 | B1 | 9/2001 | Baltzley |
| 6,824,051 | B2 | 11/2004 | Reddy et al. |
| 7,085,743 | B2 | 8/2006 | Schull |
| 7,209,902 | B2 | 4/2007 | Stefik et al. |
| 2002/0071565 | A1 | 6/2002 | Kurn et al. |
| 2002/0166056 | A1* | 11/2002 | Johnson et al. ............. 713/193 |
| 2004/0083392 | A1 | 4/2004 | Yang et al. |
| 2004/0088730 | A1* | 5/2004 | Gopalan et al. ............... 725/93 |
| 2004/0139315 | A1 | 7/2004 | Tokutani et al. |
| 2005/0049973 | A1* | 3/2005 | Read et al. ..................... 705/59 |
| 2006/0236369 | A1 | 10/2006 | Covington et al. |

(Continued)

FOREIGN PATENT DOCUMENTS

JP 2004-302931 10/2004

(Continued)

OTHER PUBLICATIONS

Microsoft Technet, "Planning for the Integration of the Rights Management Services Prelicensing Agent", 2007 Microsoft Corporation, 2 pages.

(Continued)

*Primary Examiner*—Andrew J. Fischer
*Assistant Examiner*—Jamie Kucab
(74) *Attorney, Agent, or Firm*—Workman Nydegger

(57) ABSTRACT

The present invention extends to methods, systems, and computer program products for pre-performing operations for accessing protected content. Cryptographic user key pairs can be pre-generated and distributed in response to a variety of different events prior to provisioning client machine for accessing protected content. Usage licenses can be pre-generated and allocated prior to requests for usage licenses. Usage licenses can be pre-obtained for client machines prior to client machines access protected content. Pre-performed operations can be performed in response to detected events, such as, for example, reduced resource consumption in a Digital Rights Management system.

7 Claims, 6 Drawing Sheets

U.S. PATENT DOCUMENTS

| | | |
|---|---|---|
| 2007/0056018 A1 | 3/2007 | Ridlon et al. |
| 2007/0076889 A1 | 4/2007 | Derobertis |
| 2007/0204078 A1 | 8/2007 | Boccon-Gibod et al. |
| 2008/0243699 A1* | 10/2008 | Hilerio et al. ............... 705/59 |

FOREIGN PATENT DOCUMENTS

| | | |
|---|---|---|
| KR | 10-2005-0098833 | 10/2005 |
| KR | 10-2007-0070643 | 7/2007 |

OTHER PUBLICATIONS

Microsoft Windows Rights Management Services, "Technical Overview of Windows Rights Management Services for Windows Server 2003", Published Nov. 2003, Updated Apr. 2005, 25 pages.

* cited by examiner

PRE-PERFORMING OPERATIONS FOR ACCESSING PROTECTED CONTENT

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic content. Accordingly, the performance of many computing tasks are distributed across a number of different computer systems and/or a number of different computing components.

Nonetheless, although electronic content may be accessible to a number of computer systems, the creator of the electronic content may desire to limit access to the electronic data. In some environments, one or more access mechanisms, such as, for example, password protection, setting file attributes, (e.g., read-only, etc.), firewalls, etc., can be used to limit access to electronic content. These mechanisms provide essentially the same electronic content access to anyone. However, if some one can access a file, there is typically no limitation on what a user can do with the contents of a file. For example, if a user can read a file, the user copy the file to another location in which others may be able to access the file, the use can print the file and leave a hardcopy somewhere, etc, typically with no limitations.

As a result, in some environments, an electronic content creator may desire more configurable and/or granular access control to their electronic content. In these other environments, a content creator can use Digital Rights Management (DRM) to control access to their electronic content. DRM generally includes access control technologies used by content creators to limit usage of electronic content (or instances thereof). Thus, various different types of DRM have been developed to protect different types of electronic content, such as, for example, pictures, movies, videos, music, programs, multi-media, games, documents, etc.

One category of DRM, Enterprise Rights Management (ERM) is often used to control access to documents, such as, for example, electronic mail messages, Word processing documents, and Web pages, etc. Rights Management Services (RMS) is an ERM solution. RMS can be used to encrypt documents, and through server-based policies, prevent the documents from being decrypted except by specified people or groups, in certain environments, under certain conditions, and for certain periods of time. Document based operations like printing, copying, editing, forwarding, and deleting can be allowed or disallowed by document authors for individual documents. RMS administrators can deploy RMS templates that group these rights together into predefined policies that can be applied en masse.

Accordingly, RMS-protected content can be created by RMS-enabled applications. RMS-protected content is encrypted and can contain an embedded Usage Policy, which defines the rights each user or group has to the content. An RMS system works by assigning rights to trusted entities, which are either single users or groups of users. Rights are assigned on a per-entity basis. RMS defines and recognizes several rights by default—such as permission to read, copy, print, save, forward, and edit—and can be extended to recognize additional rights (which each application would have to explicitly implement).

The use of RMS (or other DRM mechanisms), has become increasingly popular in the business setting to protect proprietary or confidential information within a business network. For example, a CEO of a large corporation may wish to distribute an e-mail that includes trade-secrets. Because of the confidential nature of this information, however, the CEO may wish to limit the actions recipients may take in regard to this message. For example, the CEO may wish to allow upper-level management to read, copy, print and save the confidential information; however, she may wish to limit other employees to read-only access or to no access at all. Accordingly, through the use of RMS the CEO can specify who is authorized to view the protected message and what actions they may take in regards thereto.

DRM processing is for the most part performed in an "on-demand" manner. That is, at the time a user desires to access protected information, the user requests a usage license for the protected information. The DRM system performs needed calculations and evaluations and, if authorization is sufficient, provides a usage license back to the user.

For example, any participant desiring to utilize DRM services must initiate a provisioning process to obtain cryptographic keys for use with DRM services. Thus, a participant initially provisions a DRM server to be set up for using DRM at services. In response to a provisioning request from a participant, a provisioning process is initiated for the participant. The responsive provisioning process typically includes authentication and identification of a user. Authentication of users can include queries to authentication authorities to verify a user's identify. Authentication is followed by generation and storage of a principal cryptographic key for the user. Principal cryptographic keys are typically only generated and distributed in response to a provisioning request. Generation of principal keys can include various cryptographic operations. Further cryptographic operations can be performed to protect principal keys prior to storage. These cryptographic operations can consume considerable system resources.

Next, a usage policy for the protected content is specified. The usage policy specifies a set of principals (e.g., people, applications, groups of either, etc.), what types of access they are allowed (e.g., read, write, forward, copy, etc.), access conditions (e.g., single-user, tied to a specific device, etc.), and for how long. The usage policy can also specify the author of the policy and optionally can specify the key used to encrypt the information if the information is encrypted. The usage policy is then signed so tampering can be detected. Creating a usage policy also can thus include various cryptographic operations, directory queries to resolve principals, and queries to other network resources to retrieve policy templates, principal keys, identities, etc.

Accordingly, when access to protected content is requested by a recipient, the recipient must acquire the usage policy for the protected content. The recipient must then query an authorization server and provide the recipient's identification and authentication and the usage policy to the authorization server. The authorization server processes the usage policy and determines if the recipient has access to the protected content. Determining recipient access can include further cryptographic operations and queries to resolve principals expressed in the usage policy.

If a usage policy grants a recipient access to protected content, a usage license (a portion of the usage policy) specifically targeted to the recipient is generated. A usage license is typically generated only in response to a request to access protected content. Generating a usage license can include cryptographic operations to decrypt and encrypt content keys and sign the usage license. These cryptographic operations can also consume considerable system resources.

Accordingly, DRM based information protection mechanisms typically include calculation and evaluation of complex criteria including those from distributed data sources and network resources, cryptographic operations, and expressions of policy. Using DRM mechanisms, a content creator can specify access rights to protected content with a high degree of granularity.

Unfortunately, most if, not all, DRM systems have several drawbacks and deficiencies. For example, typically the recipient of the protected content is required to obtain a usage license from a DRM server in order to open and use the protected content. If, however, a user is on remote location or does not otherwise have access to a DRM server the user may not be able to obtain a usage license. Such an instance could arise when an employee downloads a protected e-mail onto their laptop, and later opens the item when not connected to the network, e.g. when traveling. Alternatively, corporate policy may be established to protect the sensitive keys within a DRM server from those outside the network. Accordingly, the corporation may not allow access to the DRM server to employees on remote location. Thus, a user that previously downloaded protected content before going on remote location may not be able to access the content while at the remote location because they cannot get authorization from the DRM server.

Further, due in part to the number and complexity of DRM calculations needed to provision and access protected content, a DRM server's resources can limit the number of DRM requests that can be simultaneously processed. Sustained high demand or spikes in DRM related activity result in increased operational costs and can lead to unfavorable response times, failed requests, and loss of productivity. The problem can be further aggravated due to difficulties associated with modeling and predicting increased demands. That is, information technology workers may have no way to determine when increased demands and/or spikes may occur. Load balancing may be particularly difficult when information protection is scaled to large numbers of users, such as, for example, as one would encounter in an internet service, or in a high-use or moderately sized enterprises. In these environments, DRM poses significant engineering and operational/infrastructure challenges.

For example, a CEO may send a protected electronic message to an entire company having hundreds or thousands of employees. As such, hundreds or thousands of employees (some with no prior use of DRM services and/or some that have expired user keys) may attempt to access the electronic message in a relatively short period of time. However, the typical load on DRM servers at the company may be much lower. Thus, the DRM servers are configured with resources to process the typically reduced load. As such, the resources of the DRM servers are quickly consumed and overburdened, providing a suboptimal experience to many users.

Further, using the typical "on-demand" request paradigm, the responsibility to initiate provisioning, publishing, and consumption workflows is distributed to end-users. However, this also distributes various error handling mechanisms to the end-users. Thus, when errors or transient failures occur end-users are negatively impacted. Additionally, in interconnected or cloud environments, such as, for example, the Internet, usage patterns and performance (e.g., of user devices) vary significantly and as such may not lend themselves to user initiated operations.

BRIEF SUMMARY

The present invention extends to methods, systems, and computer program products for pre-performing operations for accessing protected content. In some embodiments, principal cryptographic key pairs for use in Digital Rights Management (DRM) operations are pre-generated prior to receiving a key request for a principal cryptographic key pair. An authorization server receives a key pre-generation request from a pre-generation module in a DRM system. The key pre-generation request is sent from the pre-generation module in response to the occurrence of a key pre-generation event within the DRM system.

The authorization server performs cryptographic operations to pre-generate one or more principal cryptographic key pairs of a compatible format for use with the DRM system in response to the key pre-generation request. The one or more principal cryptographic key pairs are pre-generated for subsequent distribution to requesting client machines in response to corresponding subsequent key requests. The authorization server stores the one or more pre-generated principal cryptographic keys in the central repository for subsequent distribution to client machines, including subsequent distribution to client machines in response to provisioning requests from client machines. Accordingly, subsequent resource consumption to provision a client machine for use with the DRM system is reduced.

In other embodiments, a usage license for use in DRM operations is generated prior to receiving a request for a usage license. A policy monitoring agent detects a pre-licensing event within the DRM system. The policy monitoring agent subsequently initiates a pre-licensing process for protected content based on a corresponding usage policy and in response to the pre-licensing event. The pre-licensing process includes identifying each possible consumer of the protected content from the usage policy.

For each possible consumer, the DRM system determines how and under what conditions the consumer can use the DRM protected content from the usage policy. Cryptographic operations are performed to pre-generate a usage license for the consumer. The usage license expresses how and under what conditions the consumer can use the DRM protected content. The pre-generated usage license is allocated for subsequent distribution to client machines, including subsequent distribution to a client machine in response to a consumer request to use the DRM protected content. Accordingly, further resource consumption to distribute the usage license to a client machine is reduced when satisfying a consumer request.

In additional embodiments, a usage license for protected content is obtained prior to receiving a request to use the protected content. A client licensing agent accesses a usage policy for DRM protected content. The usage policy describes how and under what conditions one or more principals can use the DRM protected content. The client licensing agent identifies a set of principals named in the usage policy.

For each principal in the identified set of principals, the client licensing agent queries a network resource for a principal public key from a principal cryptographic key pair for the principal. The client licensing agent receives a principal public key for the principal from the network resource. The client licensing agent includes the principal public key in a query to the DRM server for a usage license for the principal. The client licensing agent receives a usage license for the principal from the DRM server. The client licensing agent stores the received usage license for the principal. Accordingly, further resource consumption to deliver the usage license to a client machine is reduced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
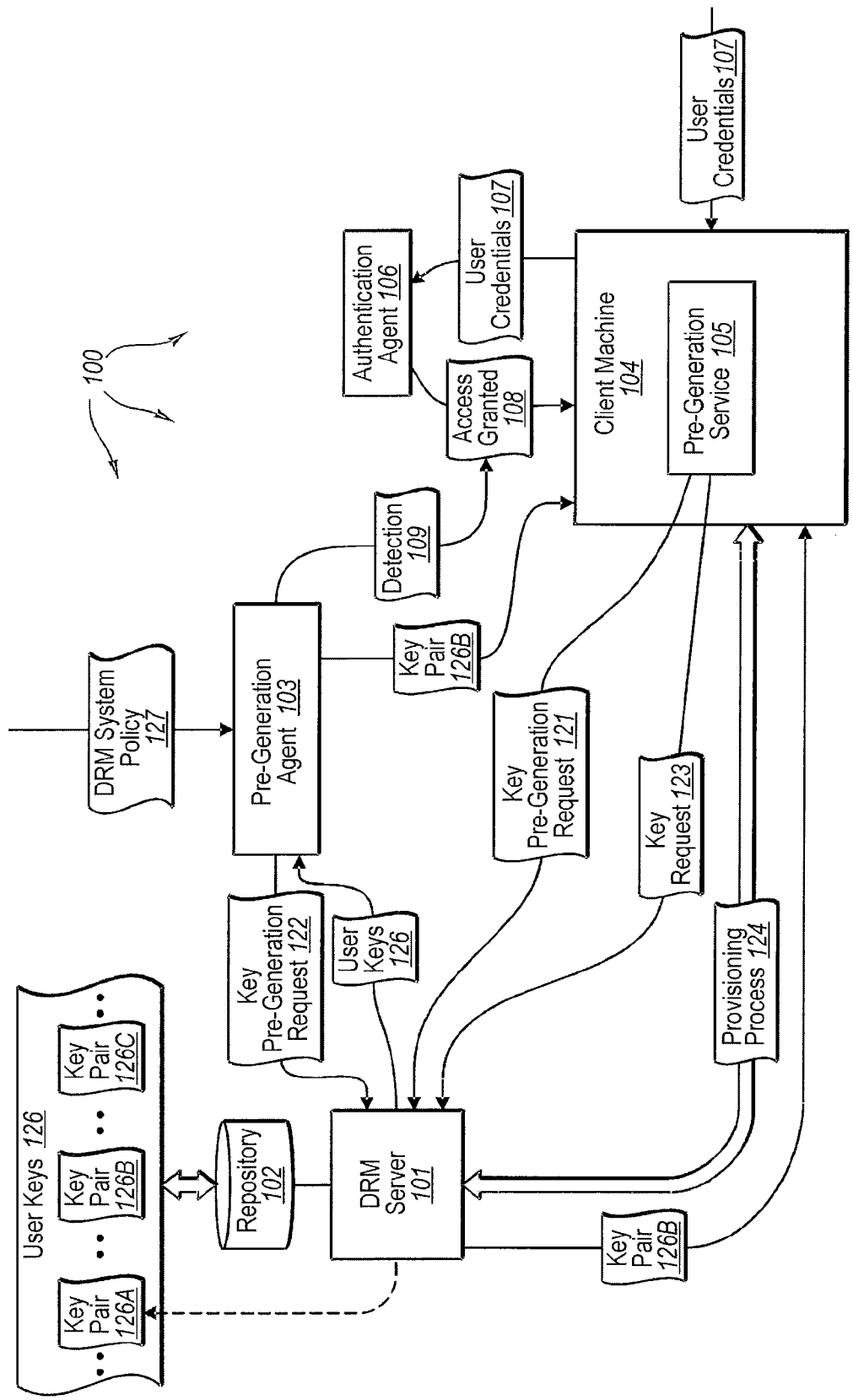
FIGS. 1A, 1B, and 1C illustrate an example computer architecture that facilitates pre-performing operations for accessing protected content.

The present invention extends to methods, systems, and computer program products for pre-performing operations for accessing protected content. In some embodiments, principal cryptographic key pairs for use in Digital Rights Management (DRM) operations are pre-generated prior to receiving a key request for a principal cryptographic key pair. An authorization server receives a key pre-generation request from a pre-generation module in a DRM system. The key pre-generation request is sent from the pre-generation module in response to the occurrence of a key pre-generation event within the DRM system.

The authorization server performs cryptographic operations to pre-generate one or more principal cryptographic key pairs of a compatible format for use with the DRM system in response to the key pre-generation request. The one or more principal cryptographic key pairs are pre-generated for subsequent distribution to requesting client machines in response to corresponding subsequent key requests. The authorization server stores the one or more pre-generated principal cryptographic keys in the central repository for subsequent distribution to client machines, including subsequent distribution to client machines in response to provisioning requests from client machines. Accordingly, subsequent resource consumption to provision a client machine for use with the DRM system is reduced.

In other embodiments, a usage license for use in DRM operations is generated prior to receiving a request for a usage license. A policy monitoring agent detects a pre-licensing event within the DRM system. The policy monitoring agent subsequently initiates a pre-licensing process for protected content based on a corresponding usage policy and in response to the pre-licensing event. The pre-licensing process includes identifying each possible consumer of the protected content from the usage policy.

For each possible consumer, the DRM system determines how and under what conditions the consumer can use the DRM protected content from the usage policy. Cryptographic operations are performed to pre-generate a usage license for the consumer. The usage license expresses how and under what conditions the consumer can use the DRM protected content. The pre-generated usage license is allocated for subsequent distribution to client machines, including subsequent distribution to a client machine in response to a consumer request to use the DRM protected content. Accordingly, further resource consumption to distribute the usage license to a client machine is reduced when satisfying a consumer request.

In additional embodiments, a usage license for protected content is obtained prior to receiving a request to use the protected content. A client licensing agent accesses a usage policy for DRM protected content. The usage policy describes how and under what conditions one or more principals can use the DRM protected content. The client licensing agent identifies a set of principals named in the usage policy.

For each principal in the identified set of principals, the client licensing agent queries a network resource for a principal public key from a principal cryptographic key pair for the principal. The client licensing agent receives a principal public key for the principal from the network resource. The client licensing agent includes the principal public key in a query to the DRM server for a usage license for the principal. The client licensing agent receives a usage license for the principal from the DRM server. The client licensing agent stores the received usage license for the principal. Accordingly, further resource consumption to deliver the usage license to a client machine is reduced.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

With this description and following claims, a "principal" is defined as an individual, group, or entity to whom information can be protected.

With this description and following claims, a "usage policy" is defined as an expression of policy for protected information that completely describes every principal who can use the information, in what ways, and with what conditions.

With this description and following claims, a "usage license" is defined as an expression of policy for protected information that describes a specific principal who can use the information, in what ways, and with what conditions.

With this description and following claims, a "directory" is defined as a structured repository of information on a network which includes details needed for information protection, such as principal identities, group memberships, keys, etc.

With this description and following claims, an "authorization server" is defined as a component of an information protection system which issues usage licenses based on the evaluation of criteria, including those expressed in a usage policy. Digital Rights Management (DRM) servers and Rights Management Services (RMS) servers are examples of authorizations servers.

With this description and following claims, a "participant" is defined as any entity which interacts with an information protection system, e.g. a user, an agent, a server, etc.

Within this description and following claims, a "publisher" is defined as a participant that establishes a usage policy for content. The publisher may also indicate how to protect content in accordance with a usage policy.

Within this description and following claims, a "consumer" is defined as a participant that attempts to use protected content. A consumer can be an individual or entity to whom information is being protected. A consumer can also be a member of a group to whom information is being protected.

Figure 1B:
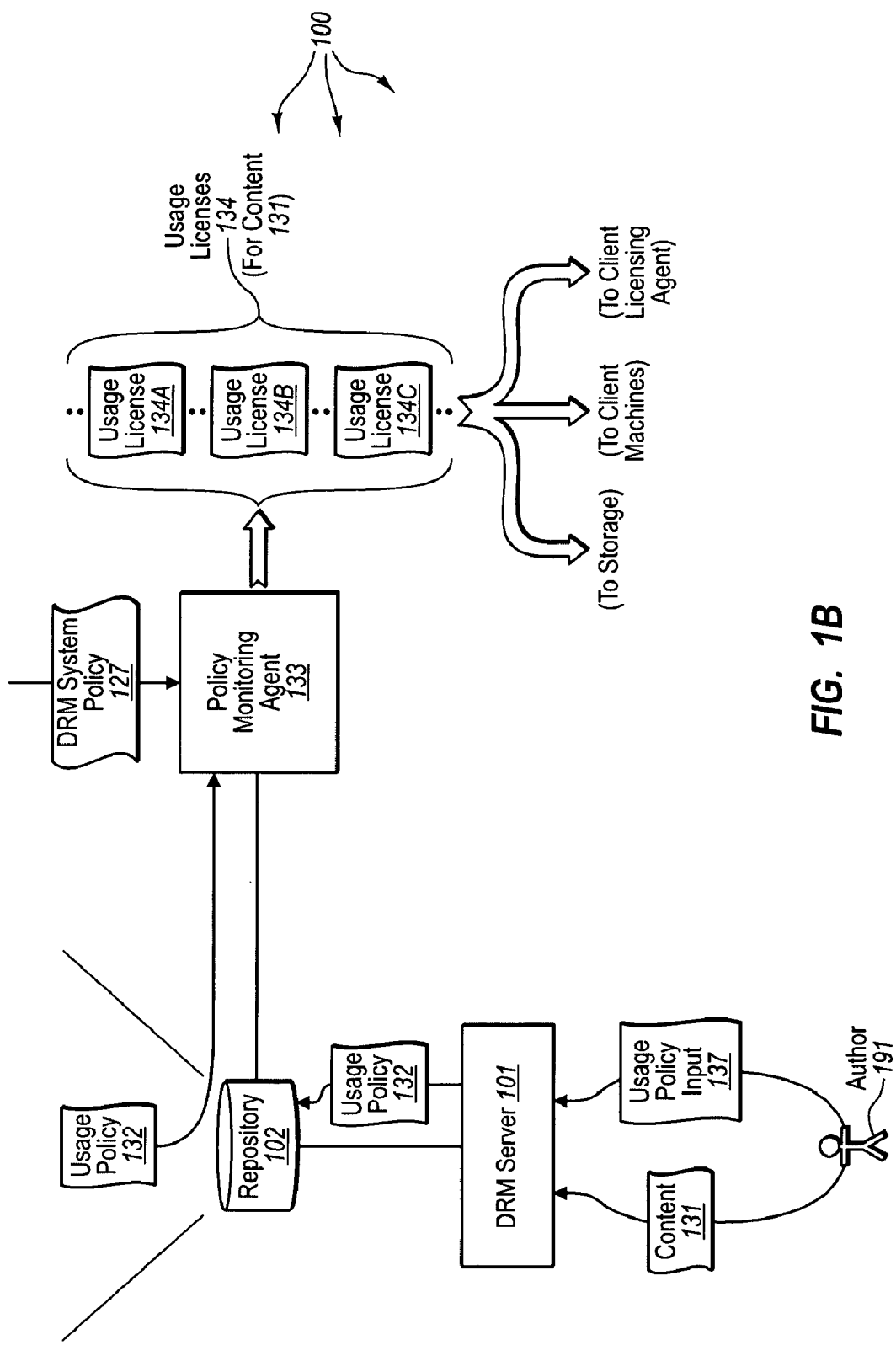
Figure 1C:
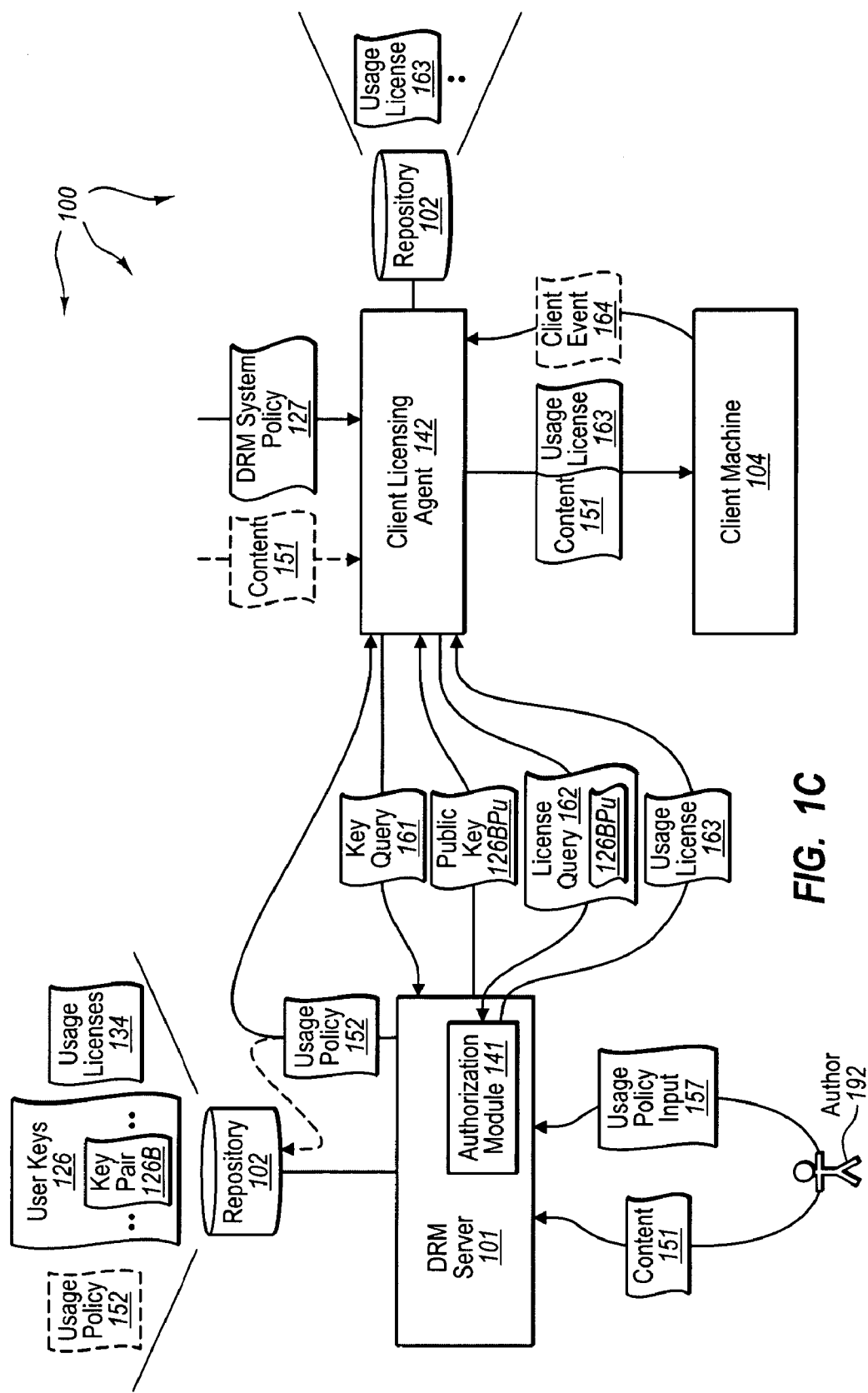

FIGS. 1A, 1B and 1C illustrate an example computer architecture 100 that facilitates pre-performing operations for accessing protected content. As depicted, computer architecture 100 can include variety of different components including client machine 104, DRM server 101, repository 102, pre-generation agent 103, policy monitoring agent 133, and client licensing agent 142. Each of the depicted components can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Referring now to FIG. 1A, client machine 104 can further include pre-generation service 105. Generally, either of pre-generation agent 103 and pre-generation service 105 can be configured to detect key pre-generation events. In response to a key pre-generation event either of pre-generation agent 103 and pre-generation service 105 can send a key pre-generation request to DRM server 101.

In some embodiments, pre-generation agent 103 and/or pre-generation service 105 detects when a participant successfully logs on (e.g., to the network) at client machine 104. In response to a successful logon, pre-generation agent 103 and/or pre-generation service 105 send a key pre-generation request to DRM server 101 to pre-generate a principal cryptographic key pair (a public/private key pair) for the user. For example, client machine 104 can receive user credentials 107 and forward those credentials to authentication agent 106. In response, authentication agent 106 can return access granted message 108. When either of pre-generation service 105 and pre-generation agent 103 detects access granted message 108, they can send a key pre-generation request to DRM server 101.

Alternately, pre-generation agent 103 can from time to time send a key pre-generation request to DRM server 101 in accordance with DRM system policy 127. DRM system policy 127 can include policy statements that indicate when key pre-generation requests are to be sent. For example, DRM system policy 127 can indicate that key pre-generation requests are to be sent to DRM server 101 when resource availability (e.g., system memory, network bandwidth, etc.) at DRM server 101 is at or exceeds a specified threshold. DRM server 101 can monitor one or more resources (e.g., through system diagnostic data). When available resources exceed the specified threshold, DRM server 101 can initiate pre-processing activities. When resource availability is higher, DRM server 101 is likely in a time of lower demand (e.g., non-business hours).

In response to a key pre-generation request, DRM server 101 can perform cryptographic and storing operations to create and store one or more principal cryptographic key pairs in repository 102. The principal cryptographic key pairs can be of a format compatible for use within computer architecture 100. Thus, resource intensive cryptographic and other operations for key generation can be performed when DRM server 101 is in relatively lower demand.

During a subsequent provisioning processes for a participant (potentially during a time of increased load on the DRM system), a stored principal cryptographic key pair can be associated with a principal and distributed. Retrieving a stored principal cryptographic key pair (as opposed to performing cryptographic and other operations to generate a principal cryptographic key pair during the provisioning process) can reduce the resource burden on RMS server 101 during times of relatively higher demand.

Further, pre-generation agent 103 can initiate the provisioning process for client machine 104. During the provisioning process, pre-generation agent 103 can receive a principal cryptographic key pair for a user of client machine 104. Pre-generation agent 103 can push the principal cryptographic key pair down to client machine 104. Accordingly, a client machine can be pre-provisioned with a principal cryptographic key pair. Pre-generation agent 103 can refer to DRM system policy 127 to determine whether pre-provisioning client machine 104 is appropriate.

In some embodiments, pre-generation agent 103 balances the current load of DRM server 101 against the subsequent efficiency gain in pre-provisioning client machine 104. If resource availability is relatively high (e.g., at or above a specified threshold), pre-generation agent 103 can go ahead and pre-provision client machine 104. On the other hand, if resource availability is relatively low (e.g., below the specified threshold), pre-generation agent 103 can defer pre-provisioning to a time of reduced load or forgo pre-provisioning. Thus, DRM server 101 can allocate resources to pre-processing activates without significant impact on those that are using DRM server 101. Accordingly, the performance of DRM related operations can be distributed across time reducing the potential for sustained high demand and/or demand spikes.

Storage of principal cryptographic key pairs within repository 102 also facilitates asynchronous access to the principal cryptographic key pairs. For example, it may that a consumer accesses protected content via a plurality of different client machines. Thus, the consumer may provision via one client machine to obtain a principal cryptographic key pair. When the user logs on at a different client machine, a pre-generation service (e.g., pre-generation service 105) can request the consumer's principal cryptographic key pair from repository 102. Accordingly, the principal cryptographic key pair can be downloaded before it is required to consume protected content.

Figure 2:
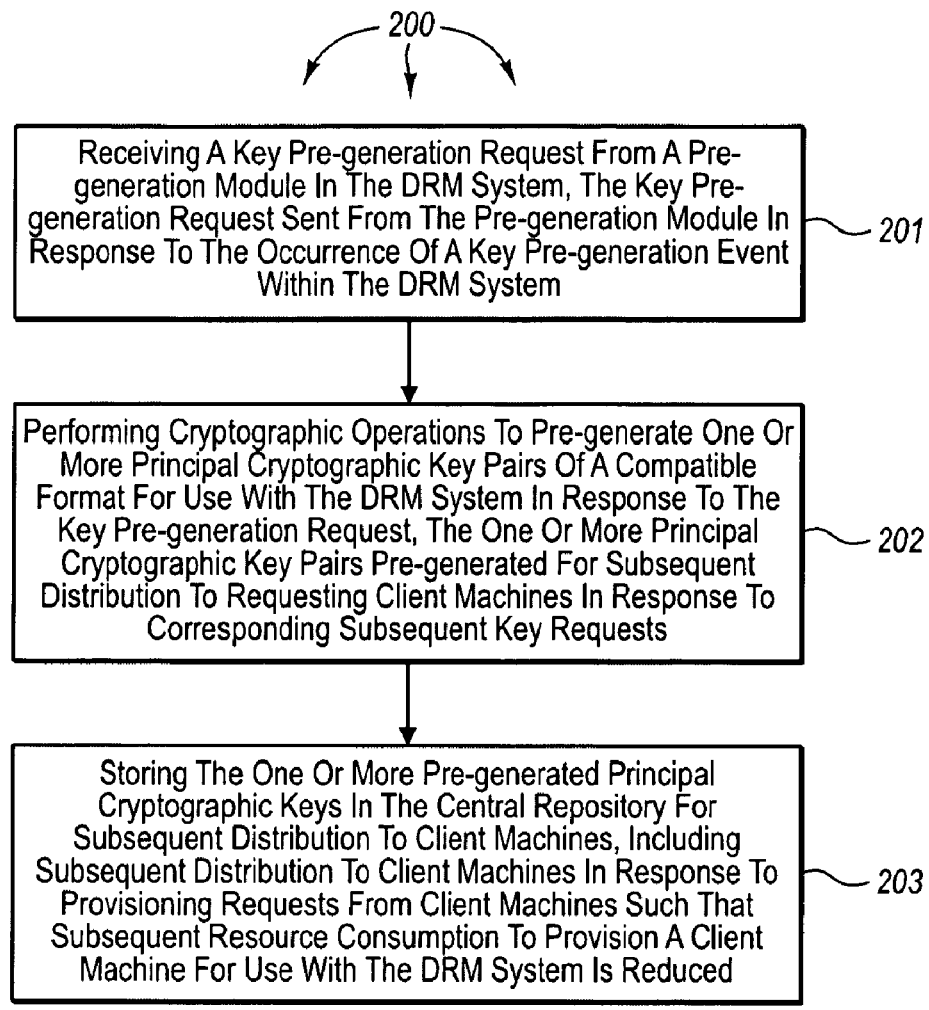
FIG. 2 illustrates a flow chart of an example method for pre-generating principal cryptographic key pairs for use in Digital Rights Management (DRM) operations prior to receiving a key request for a principal cryptographic key pair.

FIG. 2 illustrates a flow chart of an example method 200 for pre-generating principal cryptographic key pairs for use in Digital Rights Management (DRM) operations prior to receiving a key request for a principal cryptographic key pair. Method 200 will be described with respect to the components and data in FIG. 1A.

Method 200 includes an act of receiving a key pre-generation request from a pre-generation module in the DRM system, the key pre-generation request sent from the pre-generation module in response to the occurrence of a key pre-generation event within the DRM system (act 201). For example, DRM server 101 can receive key pre-generation request 122 from pre-generation agent 103. Pre-generation agent 103 can send key pre-generation request 122 in response to detecting (detection 109) a successful log on (access granted 108) at client machine 104. Alternately, pre-generation agent 103 can send key pre-generation request 122 in response to policy statements in DRM system policy 127. In other embodiments, pre-generation service 105 sends key pre-generation request 121 in response to detecting a successful log on (access granted 108) at client machine 104. Key pre-generation request 121 can also be triggered by other events, such as, for example, an enterprise scheduled time event, a password expiration event, and a password change event. Accordingly, a variety of different modules can request the pre-generation of principal cryptographic key pairs and prior to and/or in response to a variety of events other than client provisioning.

Method 200 includes an act of performing cryptographic operations to pre-generate one or more principal cryptographic key pairs of a compatible format for use with the DRM system in response to the key pre-generation request, the one or more principal cryptographic key pairs pre-generated for subsequent distribution to requesting client machines in response to corresponding subsequent key requests (act 202). For example, in response to key pre-generation request 121 or 122, DRM server 101 can generate user keys 126. User keys 126 can include one or more (e.g., public/private) principal cryptographic key pairs, including key pairs 162A, 126B, 126C, etc. User keys 126 are generated for subsequent distribution to requesting client machines, such as, for example, client machine 104, in response to key requests.

Method 200 includes an act of storing the one or more pre-generated principal cryptographic keys in a central repository for subsequent distribution to client machines, including subsequent distribution to client machines in response to provisioning requests from client machines such that resource consumption to provision a client machine for use with the DRM system is reduced (act 203). For example, user keys 126 can be stored in repository 102 for subsequent distribution to client machines including client machine 104.

Key pairs can then be distributed to client machines. For example, in response to detecting a successful logon, client machine 104 can send key request 123 to DRM server 101. In response to key request 123, DRM server 101 can distributed key pair 126B to client machine 104. If the user corresponding to credentials 107 has previously provisioned, key pair 126B can be retrieved from repository 102 and returned to client machine 104. On the other hand if the user has not previously provisioned, the client machine 104 can initiate provisioning process 124.

In some embodiments, user keys 126 are transferred to pre-generation agent 103. Upon detecting (e.g., detection 109) a successful logon (e.g., access granted 108) at client machine 104, pre-generation agent 103 distributes key pair 126B to client machine 104. Thus, a logon event at client machine 104 can trigger pre-generation and/or distributed of user keys.

Thus, cryptographic operations for generating user keys are performed prior to user keys being requested. Accordingly, system resources for completing distribution of a key pair in response to a subsequent key request are (potentially significantly) reduced. Further, when user key distribution occurs in response to a logon event, there is a higher likelihood of a user having keys located at a client machine prior to consuming protected content.

Turning now to FIG. 1B, FIG. 1B includes policy monitoring agent 133. Generally, policy monitoring agent 133 is configured generate a usage license for use in DRM operations prior to receiving a request for a usage license. Policy monitoring agent 133 monitor repository 102 for usage policies and pre-generate usage licenses for usage policies.

To protect content an author can indicate the content and a usage policy for the content to DRM server 101. Policy monitoring agent 133 can detect the storage of usage policies at repository 102. Policy monitoring agent 133 can expand the list of principals identified in a usage policy to identify each possible consumer of the content. From the identified consumers, policy monitoring agent 133 can refer the usage policy to determine rights each identified consumer has to the content. Based on the rights, policy monitoring agent 133 can pre-generate usage licenses for consumers before client machines request usage licenses. Policy monitoring agent 133 can store pre-generated usage licenses in repository 102, distribute pre-generated usage licenses to client machines, and send pre-generated usage licenses to a client licenses agent (e.g., that controls distribution to client machines). Policy monitoring agent 133 can refer to DRM system policy 127 to determine when pre-licensing activities are to occur (e.g., times of increased resource availability at DRM server 101, any time a new usage policy is detected, etc.). In some embodiments, resource availability thresholds are monitored to determine when pre-licensing activities are appropriate.

Figure 3:
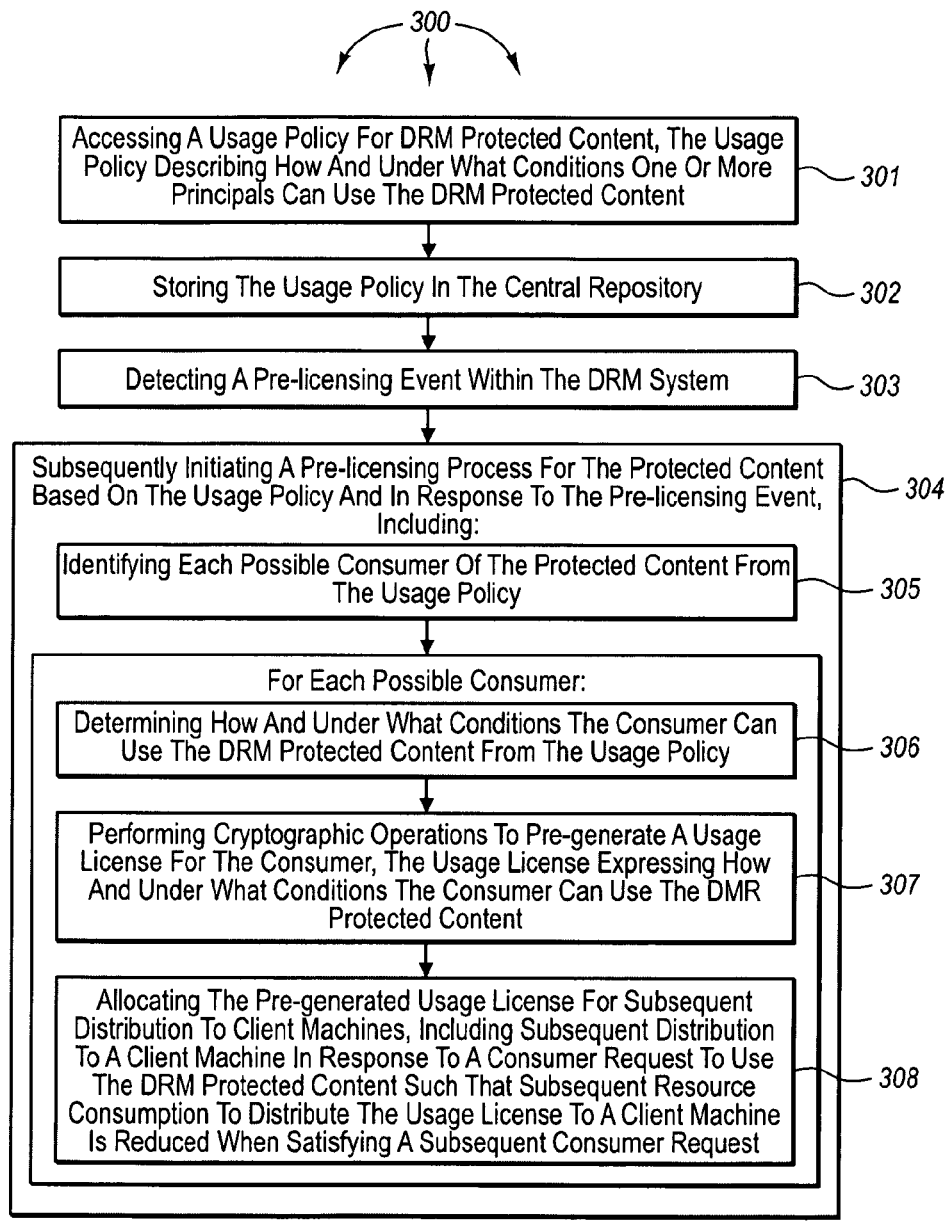
FIG. 3 illustrates a flow chart of an example method for generating a usage license for use in DRM operations prior to receiving a request for a usage license.

FIG. 3 illustrates a flow chart of an example method for generating a usage license for use in DRM operations prior to receiving a request for a usage license. Method 300 will be described with respect to the components and data in FIG. 1B.

Method 300 includes an act of accessing a usage policy for DRM protected content, the usage policy describing how and under what conditions one or more principals can use the DRM protected content (act 301). For example, DRM server 101 can access usage policy input 137 for content 131 (e.g., both submitted by author 191). Usage policy input 157 indicates usage policy 132 that describes how and under what conditions one or more principals can use content 131.

Method 300 includes an act of storing the usage policy in the central repository (act 302). For example, DRM server 101 can store usage policy 132 in repository 102. Method 300 includes an act of detecting a pre-licensing event within the DRM system (act 303). For example, policy monitoring agent 133 can detect a pre-licensing event within computer architecture 100. In some embodiments, a pre-licensing event is an express command to initiate pre-licensing of protected content. In other embodiments, a pre-licensing event is a detected change in system characteristics and/or available diagnostic information (e.g., time of day, available resources, etc.) for DRM server 101 and/or elsewhere within computer architecture 100. Policy statements within DRM system policy 127 can define changes indicative of a pre-licensing event.

Method 300 includes an act of subsequently initiating a pre-licensing process for the protected content based on the usage policy and in response to the pre-licensing event (act 304). For example, policy monitoring agent 133 can initiate a pre-licensing process for content 133 based on usage policy 132 in response to a pre-licensing event.

Act 304 can include an act of identifying each possible consumer of the protected content from the usage policy (act 305). For example, policy monitoring agent 133 can analyze the list of all principals in usage policy 132 (including expanding groups) to identify each possible consumer of content 131. Analyzing principals can include cryptographic operations to verify signatures, queries to a directory to resolve principals, queries to a directory to resolve group memberships, and queries to authorizations servers to delegate operations.

For each possible consumer, method 300 includes an act of determining how and under what conditions the consumer can use the DRM protected content from the usage policy (act 306). For example, policy monitoring agent 133 can analyze usage policy 132 to determine how and under what conditions the consumer can use content 131. For each possible consumer, method 300 includes performing cryptographic operations to pre-generate a usage license for the consumer, the usage license expressing how and under what conditions the consumer can use the DRM protected content (act 307). For example, policy monitoring agent 133 can perform cryptographic operations to pre-generate usage licenses 134 (for content 131), including usage licenses 134A, 134B, and 134C. Cryptographic operations can include decrypting and encrypting content keys and signing a usage license.

For each possible consumer, method 300 includes an act of allocating the pre-generated usage license for subsequent distribution to client machines, including subsequent distribution to a client machine in response to a consumer request to use the DRM protected content such that subsequent resource consumption to distribute the usage license to a client machine is reduced when satisfying a consumer request (act 308). For example, policy monitoring agent 133 can allocate usage licenses 134 (for content 131), including usage licenses 134A, 134B, and 134C, for subsequent distribution to client machines (e.g., client machine 1040.

In some embodiments, allocation includes storage of usage licenses 135, such as, for example, in repository 102. In other embodiments, allocation includes distribution directly to client machines. In even other embodiments, allocation includes distribution to a client licensing agent that subsequently handles further distribution to client machines.

Thus, cryptographic and querying operations for generating usage licenses are performed prior to usage licenses being requested. Accordingly, system resources for completing distribution of a usage license in response to subsequent requests to use protected content are (potentially significantly) reduced. Further, when usage licenses are distributed to client machines prior to requests to use protected content, the client machines may be able to use protected content without communicating with DRM server 101.

Turning now to FIG. 1C, FIG. 1C includes client licensing agent 142. Licensing agent 142 is general configured to obtaining a usage license for protected content prior to receiving a request to use the protected content. In response to some triggering event, licensing agent 142 can request usage licenses for the protected content. Triggering events include detecting when a usage policy is first created and associated with protected information, when a usage policy is created and stored in repository 102, when protected content associated with a usage policy is accessed, etc.

Client licensing agent 143 can expand the list of principals identified in a usage policy to identify each possible consumer of the content. Based on identified possible consumers, client licensing agent 143 can query DRM server 101 for user keys for the identified possible consumers. Using the user keys, client licensing agent 143 can then query authorization module 141 for usage licenses for each possible consumer. Alternately, client licensing agent 143 can obtain usage licenses for identified principals and handle group expansions at a later time.

Client licensing agent 143 stores the usages license for each consumer (or principal). Usage licenses can be stored within protected information at the time of creation and/or associational with the usage policy. Usage licenses can be stored in repository 143. Usage license can distributed from repository 143 to client machines "on-demand" when a user attempts to consume content. Usage licenses can be pushed from repository 143, proactively in response to a logon or other trigger. Usage licenses can be sent along with protected content to a client machine whether or not usage licenses are stored at repository 143.

Figure 4:
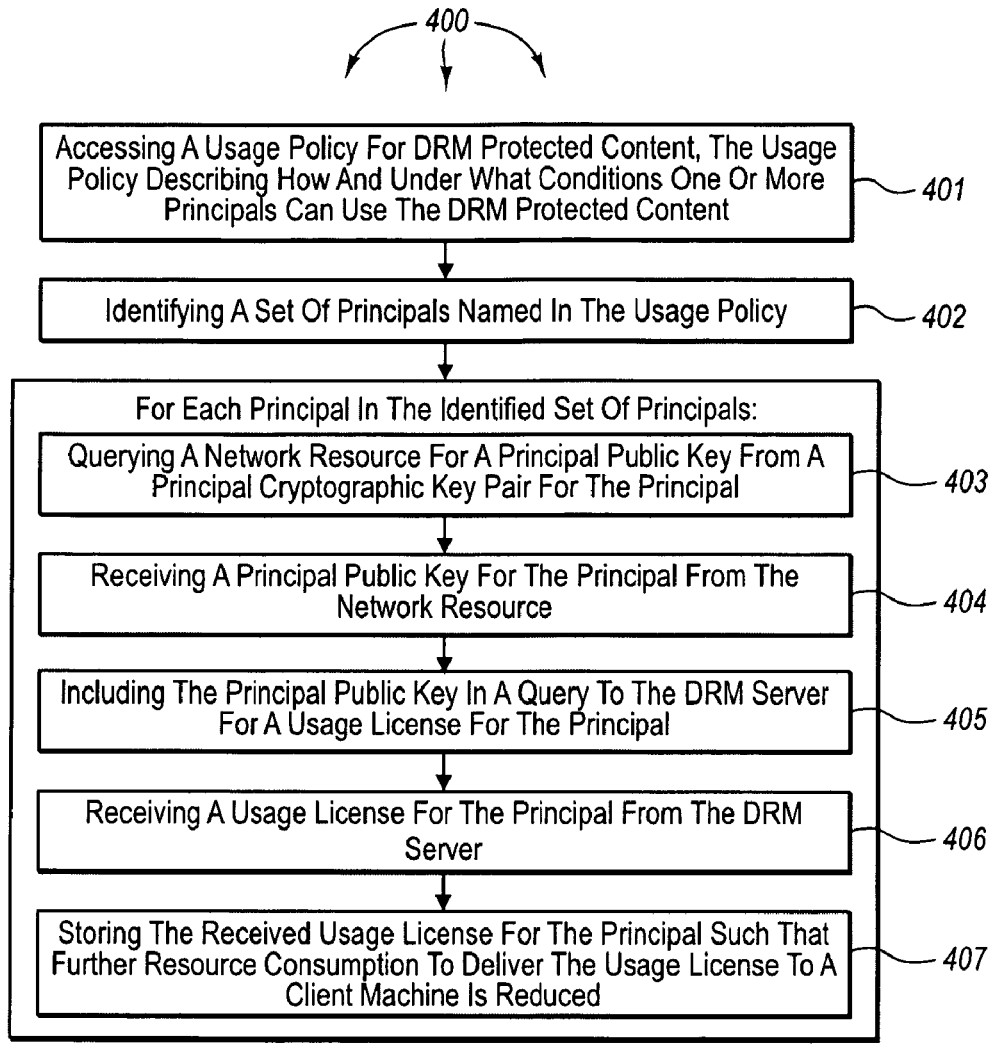
FIG. 4 illustrates a flow chart of an example method for obtaining a usage license for protected content prior to receiving a request to use the protected content.

FIG. 4 illustrates a flow chart of an example method for obtaining a usage license for protected content prior to receiving a request to use the protected content. Method 400 will be described with respect to the components and data in FIG. 1C.

Method 400 includes an act of accessing a usage policy for DRM protected content, the usage policy describing how and under what conditions one or more principals can use the DRM protected content (act 401). For example, client licensing agent 142 can access usage policy 152. Usage policy input 157 indicates usage policy 152 that describes how and under what conditions one or more principals can use content 151. Client licensing agent 142 can access usage policy 152 when usage policy 152 is first created, when usage policy 152 is associated with content 151, when usage policy 152 is stored at repository 102, or at some later time.

Method 400 includes an act of identifying a set of principals named in the usage policy (act 402). For example, client licensing agent 142 can analyze usage policy 152 to identify each possible principal for content 151.

For each identified principal, method 400 includes an act of querying a network resource for a principal public key from a principal cryptographic key pair for the principal (act 403). For example, client licensing agent 142 can send key query 161 to DRM server 101 to query for public keys for principals indicated in usage policy 152.

For each identified principal, method 400 includes an act of receiving a principal public key for the principal from the network resource (act 404). For example, in response to key query 161, client licensing agent 142 can receive public key 126BPu (the public key of key pair 126B for a user at client machine 104), as well as public keys for other principals indicated in usage policy 152.

In some embodiments, a client licensing agent batches a plurality of queries for public keys together and submits the batch of queries together to a network resource. In response, the client licensing agent can receive a plurality of corresponding public keys respectively from the network resource.

For each identified principal, method 400 includes an act of including the principal public key in a query to the DRM server for a usage license for the principal (act 405). For example, client licensing agent 142 can include public key 126BPu in license query 162 to authorization module 141.

For each identified principal, method 400 includes an act of receiving a usage license for the principal from the DRM server (act 406). For example, in response to sending license query 162, client licensing agent 142 can receive usage license 163 (for a user at client machine 104), as well as usage licenses for other principals indicated in usage policy 152.

In response to receiving license query 162, DRM server 101 can return pre-generated licenses generated in accordance with method 300. Alternately, reception of license query 162 can be a pre-licensing event that triggers method 300 for usage policy 152.

For each identified principal, method 400 includes an act of storing the received usage license for the principal such that further resource consumption to deliver the usage license to a client machine is reduced (act 407). For example, client licensing agent 142 can store usage license 163 in repository 143, potentially along with content 151. Alternately, client licensing agent 142 can store usage license 163 within content 151 at its distribution point or at some other time/place prior to distribution to client machine 104. Client licensing agent 142 can distribute usage license 163 to client machine 104 in response to client event 164 (e.g., a logon), when client machine 104 attempts to use content 151, or from time to time as defined in DRM system policy 127.

Thus, cryptographic and querying operations for obtaining usage licenses are performed prior to usage licenses being requested. Accordingly, system resources for completing distribution of a usage license in response to subsequent requests to use protected content are (potentially significantly) reduced. Further, when usage licenses are distributed to client machines prior to requests to use protected content, the client machines may be able to use protected content without communicating with DRM server 101.

Combinations of the methods 100, 200 and 300 can be utilized with one another resulting in further efficiency gains for key and usage license creation and distribution. For example, method 100 can be used to pre-generate keys and method 200 used to pre-generate licenses. Subsequently, method 300 can be used to obtain pre-generated keys and license for distribution to client machines.

Accordingly, computer architecture 100 can absorb spikes in DRM related activity as well as sustained high demands. Workloads can be processed in a controllable manner, meeting the end-user's expectation of immediate access to their protected information once it arrives. Further, end-users are isolated from failures due to server unresponsiveness, network issues, or other problems related to provisioning, publishing and consumption workloads. Through centralization of these workloads, operational monitoring and response is simpler.

Frequently disconnected devices can receive the protected information and the usage license simultaneously, or the usage licenses can be distributed pro-actively to devices prior to an attempt to consume the protected information. Usage patterns and performance requirements for publishing and consumption in a services environment can be accounted for by the flexibility of the pre-generation process for provisioning, publishing, and consumption.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a DRM system including a DRM server, a central repository, a policy monitoring agent, and one or more client machines, a method for generating a usage license for use in DRM operations prior to receiving a request for a usage license, the method comprising:

accessing a usage policy for DRM protected content, the usage policy describing how and under what conditions one or more principals can use the DRM protected content;

storing the usage policy in the central repository;

detecting a pre-licensing event within the DRM system;

subsequently initiating a pre-licensing process for the protected content based on the usage policy and in response to the pre-licensing event, including:

identifying each possible consumer of the protected content from the usage policy;

for each possible consumer:

determining how and under what conditions the consumer can use the DRM protected content from the usage policy;

performing cryptographic operations to pre-generate a usage license for the consumer, the usage license expressing how and under what conditions the consumer can use the DRM protected content; and allocating the pre-generated usage license for subsequent distribution to client machines, including subsequent distribution to a client machine in response to a consumer request to use the DRM protected content such that resource consumption to distribute the usage license to a client machine is reduced when satisfying a subsequent consumer request.

2. The method as recited in claim 1, wherein detecting a pre-licensing event within the DRM system comprises receiving an indication that available resources of the DRM system are above a specified threshold.

3. The method as recited in claim 1, wherein performing cryptographic operations to pre-generate a usage license for the consumer comprises accessing a pre-generated cryptographic key pair for the consumer.

4. The method as recited in claim 1, wherein allocating the pre-generated usage license for subsequent distribution to client machines comprises storing the pre-generated usage license in the central repository.

5. The method as recited in claim 1, wherein allocating the pre-generated usage license for subsequent distribution to client machines comprises sending the pre-generated usage license to a client machine.

6. The method as recited in claim , wherein allocating the pre-generated usage license for subsequent distribution to client machines comprises sending the pre-generated usage license to a client licensing agent for further distribution to a client machine.

7. The method as recited in claim 1, further comprising:

a client licensing agent accessing a usage policy for the DRM protected content;

the client licensing agent identifying a set of principals named in the usage policy;

for each principal in the identified set of principals:

the client licensing agent querying a network resource for a principal public key from a principal cryptographic key pair for the principal;

the client licensing agent receiving a principal public key for the principal from the network resource;

the client licensing agent including the principal public key in a query to the DRM server for a usage license for the principal;

the client licensing agent receiving one of the pre-generated usage license for the principal from the DRM server; and the client licensing agent storing the received pre-generated usage license for the principal such that further resource consumption to deliver the pre-generated usage license to a client machine is reduced.

* * * * *